(12) United States Patent
Bjornhov et al.

(10) Patent No.: US 9,556,555 B2
(45) Date of Patent: Jan. 31, 2017

(54) METHOD FOR PRODUCING A COMPOSITE MATERIAL

(75) Inventors: Tobias Bjornhov, Falsterbo (SE); Jacob Ljungh, Malmo (SE); Rasmus Olsson, Gothenburg (SE)

(73) Assignee: R-Idea AB, Arlov (SE)

( * ) Notice: Subject to any disclaimer, the term of this patent is extended or adjusted under 35 U.S.C. 154(b) by 860 days.

(21) Appl. No.: 13/503,190

(22) PCT Filed: Oct. 22, 2010

(86) PCT No.: PCT/EP2010/065988
§ 371 (c)(1),
(2), (4) Date: Dec. 13, 2012

(87) PCT Pub. No.: WO2011/048216
PCT Pub. Date: Apr. 28, 2011

(65) Prior Publication Data
US 2013/0130583 A1    May 23, 2013

Related U.S. Application Data

(60) Provisional application No. 61/254,435, filed on Oct. 23, 2009.

(30) Foreign Application Priority Data

Oct. 23, 2009    (SE) ........................ 0950790

(51) Int. Cl.
*D06N 3/12*    (2006.01)
*B29C 70/50*    (2006.01)
(Continued)

(52) U.S. Cl.
CPC ................. *D06N 3/12* (2013.01); *B29C 70/48* (2013.01); *B29C 70/50* (2013.01); *D04H 3/12* (2013.01);
(Continued)

(58) Field of Classification Search
CPC .......... B29C 70/20; B29C 70/22; B29C 70/48; B29C 70/50; Y10T 442/2951; Y10T 428/249942; Y10T 428/249921; Y10T 442/3301; D06N 3/12; D06N 3/0006; D06N 3/0011; D04H 3/12; B29K 2707/04
See application file for complete search history.

(56) References Cited

U.S. PATENT DOCUMENTS 4,385,957 A     5/1983   Wackerle et al.
4,406,724 A  *  9/1983   Bostian, Jr. .............. D04H 1/66
                                                         156/161

(Continued)

FOREIGN PATENT DOCUMENTS

EP     0223061    5/1987
EP     0371907    6/1990
(Continued)

*Primary Examiner* — Jeremy R Pierce
(74) *Attorney, Agent, or Firm* — Lowe Graham Jones PLLC (57) ABSTRACT

A method includes a step of bringing a plastic matrix substance in contact with a reinforcement fiber structure to form an intermediate material. Further, the method includes a step of curing the matrix substance of the intermediate material to form a composite material. Before the plastic matrix substance is brought into contact with the reinforcement fiber structure, it is mixed with a diluent to form a mixture.

13 Claims, 1 Drawing Sheet (51) Int. Cl.
*B29C 70/48* (2006.01)
*D04H 3/12* (2006.01)
*D06N 3/00* (2006.01)
B29C 70/20 (2006.01)
B29C 70/22 (2006.01)
B29K 707/04 (2006.01)

(52) U.S. Cl.
CPC ........... *D06N 3/0006* (2013.01); *D06N 3/0011* (2013.01); *B29C 70/20* (2013.01); *B29C 70/22* (2013.01); *B29K 2707/04* (2013.01); *Y10T 428/249921* (2015.04); *Y10T 428/249942* (2015.04); *Y10T 442/3301* (2015.04)

(56) References Cited

U.S. PATENT DOCUMENTS

| | | | |
|---|---|---|---|
| 4,451,528 A | * | 5/1984 | Krause ................. 428/300.4 |
| 4,486,494 A | | 12/1984 | Eldin |
| 5,011,721 A | * | 4/1991 | Decker et al. ............. 442/253 |
| 5,518,385 A | | 5/1996 | Graff |
| 5,942,182 A | | 8/1999 | Hoge et al. |
| 6,036,900 A | * | 3/2000 | Munk et al. ................. 264/102 |
| 6,068,725 A | * | 5/2000 | Tweedie et al. ............. 156/287 |
| 6,784,276 B1 | * | 8/2004 | Chuang ..................... 528/170 |
| 7,501,087 B2 | | 3/2009 | Kamae et al. |
| 2004/0150130 A1 | | 8/2004 | Cundiff et al. |
| 2005/0133956 A1 | | 6/2005 | Beauchamp |

FOREIGN PATENT DOCUMENTS

| | | |
|---|---|---|
| EP | 1724306 | 11/2006 |
| EP | 2006064 | 12/2008 |
| JP | H02242829 | 9/1990 |
| JP | 08-132536 | 5/1996 |
| JP | 2001-072783 | 3/2001 |
| JP | 2005193587 | 7/2005 |
| JP | 2005225993 | 8/2005 |
| JP | 2006297829 | 11/2006 |
| JP | 2008254447 | 10/2008 |
| WO | WO0141993 | 6/2001 |

* cited by examiner

METHOD FOR PRODUCING A COMPOSITE MATERIAL

PRIORITY CLAIM

This application is a national phase of PCT/EP2010/065988 filed on Oct. 22, 2010, which claims priority to U.S. Provisional Application Ser. No. 61/254,435 filed on Oct. 23, 2009 and Swedish Application Serial No. 0950790-6 filed on Oct. 23, 2009, the contents of which are hereby incorporated by reference.

TECHNICAL FIELD

The present invention relates to production of composite materials in general and more specifically to production of composite materials comprising a matrix of cured plastic, such as epoxy, reinforced with reinforcement fibers, such as carbon fibers.

BACKGROUND

In many constructions, such as aircrafts, ships, boats, sports cars, wind mills, and golf clubs, it is highly desirable to achieve lightweight constructions having high strength and stiffness. Often, the choice of material for such constructions is some sort of composite material, such as fiber-reinforced plastics (FRP). FRP materials often have a relatively high strength-to-weight ratio and are relatively resistant to fatigue and corrosion.

Many types of plastics and types of fibers may be combined to create a FRP and material properties, such as strength and elasticity, depend on choice and combination of matrix and reinforcement material respectively.

A FRP material contains a matrix material, being the plastic, and a reinforcement material, being the fiber. Commonly used types of reinforcement fibers are glass fibers, aramid fibers and carbon fibers.

Glass fibers are relatively inexpensive fibers, and are commonly found in FRP products, such as hulls for leisure boats, for which a low price is of higher importance than a high strength-to-weight ratio.

Carbon fibers are more expensive than for example glass fibers but offer a higher strength-to-weight ratio when used in a FRP material.

Not only the choice and combination of matrix and reinforcement materials affect the material properties of the composite material. Experience in the art shows that also the method of production of the composite material, including for example combination of different reinforcement structures in different layers and use of special molds, vacuum systems and/or autoclaves, may affect the material properties of the composite material.

When producing a composite material not only is it desirable to achieve good material properties but also it is often desirable to achieve a good production economy.

One factor which may affect production economy is the capacity of the production in terms of throughput. A high throughput makes it possible to distribute the fixed production costs on a higher number of units. Another factor which affects production economy is the amount of fixed costs, such as cost for expensive special machinery (for example large ovens or autoclaves). Also, direct and indirect material costs and material waste affect the total production costs.

WO 01/41993 A2, discloses a method of producing a composite material. The described method is an attempt to achieve a composite material without using large and expensive autoclaves for removing voids in the material, and the method comprises the steps of assembling a preform from a suitable reinforcement material, in a mold; tackifying the preform with a tackifier in the mold; vacuum debulking the tackifier preform; double bagging the debulked preform with an inner bag and outer bag to control bag relaxation and to improve vacuum integrity; and infusing resin to the debulked preform using a vacuum-assisted resin transfer molding process.

However, the method disclosed in WO 01/41993 A2 has disadvantages, such as being complex to perform, and giving a relatively low strength-to-weight ratio.

As background art, the considerably older U.S. Pat. No. 4,385,957, claiming priority from a German patent application filed in 1979, should be mentioned as well. The inventors of U.S. Pat. No. 4,385,957 have recognized that particularly in connection with the impregnation of structural components having large surfaces, for example, rotor blades of helicopters and the like, or in connection with structural components having complicated shapes, it is difficult to properly control the resin flow during resin injection. This flow control problem is, according to the inventors of U.S. Pat. No. 4,385,957, due to the fact that the temperature of the resin at any particular location determines the viscosity of the resin and thus also its flowability. One way of solving the flow control problem is to use expensive and very complicated heated molds. Another way of solving the flow control problem is to use a method such as the one disclosed in U.S. Pat. No. 4,385,957, in which a resin is injected into a carbon fiber webbing which may comprise one or several layers of carbon fiber web. The required flowability of the resin and its curing is accomplished by a heat application directly through the carbon fiber webbing which is heated by passing an electrical current through the carbon fibers. Thus, the carbon fiber webbing operates directly as an electrical internal heating mat in the structural component.

Another object of U.S. Pat. No. 4,385,957 is to provide a method for manufacturing of fiber compound components or structures of any size and/or shape without the need for expensive heated molds and with reduced energy consumption as compared to using heated molds.

According to the disclosed method, electric current is fed through a carbon fiber webbing in order to generate a curing temperature of the resin. U.S. Pat. No. 4,385,957 also suggests controlling the strength of the electrical current so that it is different in different areas of the webbing whereby the intensity of the heating may be adapted to the particular area or configuration of the webbing. An unheated and electrically conducting mold is used for defining the shape of the FRP component and glass fiber webbing is used to insulate the carbon fiber webbing from the conductive mold.

Disadvantages of the method of U.S. Pat. No. 4,385,957 are that the method gives materials having low durability with regards to repeated stress and long term stress, and a relatively low strength-to-weight ratio.

Further background art is disclosed in EP 1724306 A1 and U.S. Pat. No. 4,486,494.

SUMMARY OF THE INVENTION

It is the belief of the inventors of the present invention that many industries, such as the aviation- and automotive industries, would benefit from better materials, having higher strength-to-weight ratio and better durability with regards to repeated stress and long term stress. For example, such materials would enable mass production of lighter vehicles, effectively resulting in lower energy consumption and lower environmental impact caused by said vehicles.

Also, it is the belief of the inventors of the present invention that a cost effective method is needed for the production of such materials, in order to make the composite materials available also for areas of use where material cost is largely controls the choice of material, such as in the automotive industry.

It should be understood that every improvement of the strength-to-weight ratio and durability of a material used in constructions of vehicles would lead to a decreased overall weight of the vehicle. For example in a car, this would make it possible to reduce the dimensions of various components of the vehicle, such as the engine, transmission, breaks, battery, etc., which in turn would make it possible to further reduce the dimensions of the composite material construction, leading to additional loops of material savings, cost savings and environmental savings.

Hence, an object of the invention is to provide a novel method of producing a fiber-reinforced plastic composite material which is improved over prior-art methods of the type discussed above.

A particular object of the invention is to provide a cost efficient method of producing an improved fiber-reinforced plastic composite material having high strength-to-weight ratio and high durability with regards to long-term stress and repeated stress.

These and other objects, which will appear from the following description, have now been achieved by a method according to the present invention as defined in claim 1. Preferred aspects of the method are set forth in the related dependent claims. These and other objects are also achieved by a system as defined in claim 28; preferred aspects being set forth in related dependent claims.

A method according to an aspect of the invention comprises a step of bringing a plastic matrix substance in contact with a reinforcement fiber structure to form an intermediate material. Further, the method comprises a step of curing the matrix substance of the intermediate material to form a composite material.

The intermediate material is to be interpreted as being the composite material before full curing.

Before the plastic matrix substance is brought in contact with the reinforcement fiber structure, it is mixed with a diluent to form a mixture.—During curing of the matrix substance, diluent is separated from matrix substance. Such a method has several advantages over prior art methods, such as enabling production of fiber-composite materials having a high fiber volume fraction and a high strength-to-weight ratio. A further advantage is that the matrix substance will be substantially free of inner voids, which in turn results in a reduced risk of material failure. Another advantage is that the matrix substance will thoroughly wet the reinforcement fiber structure and adhere very well to the reinforcement fibers, effectively leading to a high overall material strength, high inter-laminar strength (if a laminate is produced) and high durability with regards to long term stress and repeated stress.

According to an embodiment, separation of diluent from matrix substance is performed by adding energy to diluent from within the intermediate material. Doing so allows the separation process to be shortened, thereby enabling shorter production cycles, higher production throughput and an altogether better production economy. Also, in this way, the separation process may be well controlled, so that diluent gas is driven out of the matrix substance before the matrix substance gels or fully cures, effectively reducing the risk of gas pockets in the cured matrix substance. Further, the curing process may be accelerated, wherein production throughput may be increased and wherein any need of oven post-curing is decreased, or completely eliminated. The time savings may lead to a shorter time-to-market, something that may be very valuable for time-critical projects, such as in the automotive-, aviation-, sporting goods- or marine industries, in which production delays may be extremely expensive. Also, since heating is achieved from within the matrix material, there is no need of heated molds, altogether leading to lower mold costs, shorter production cycles and lower energy consumption (no heating/cooling of heavy molds required).

According to a further embodiment, the reinforcement fiber structure comprises electrically conductive fibers and the addition of energy is, at least partly, performed by conducting electrical current through said electrically conductive fibers. An advantage of this is that it is easy to control where in the matrix substance energy is introduced, making it possible to vary energy addition according to varying thickness of the material to be produced and thereby better control diluent evaporation throughout the material. Another advantage is that equipment used to feed energy into the reinforcement fibers is relatively inexpensive and that complex shapes may be produced with sustained control of where energy is added. Also, a high power may easily be added to the matrix substance, thereby possibly speeding up the separation process. Also, since the energy added is provided with a very high energy-efficiency, the total amount of energy needed for producing the composite material may be reduced.

In an embodiment, the addition of energy is, at least partly, performed by exerting microwaves on the intermediate material. Doing so makes it possible to easily add energy into matrix substance not comprising, or not being close to, conductive fibers. Further, it brings the advantage that locally concentrated energy addition can be performed in an easy way, thereby enabling easy production of parts with largely varying thickness. Also, this way of adding energy may easily be combined with other types of energy addition, such as the above mentioned using resistive heating of electrically conductive fibers. Another advantage of using microwaves is that energy introduced using microwaves is to a higher degree absorbed by portions of the intermediate material having a higher percentage of diluent and vice versa, wherein added energy is concentrated to portions of the intermediate material where it acts to promote separation of diluent from matrix substance rather than to promote curing.

In another embodiment, the addition of energy is, at least partly, performed by exerting sound waves on the intermediate material. Doing so makes it possible to achieve addition of energy in a relatively easy way using relatively inexpensive equipment.

Further, according to an embodiment, intermediate material is produced before being placed in a mold for separation of diluent and matrix substance. This brings an advantage in that matrix substance may be brought in contact with reinforcement fiber structure without taking up valuable time in expensive molds.

According to another embodiment, the reinforcement fiber structure is placed in a mold before matrix substance is brought in contact with the reinforcement fiber structure. An advantage of such a method is that reinforcement fibers may be kept separate from matrix substance until the time of molding, wherein the risk of material waste due to aging of input material is reduced and wherein storing of the input material does not require special environments, such as expensive and energy consuming coolers or freezers.

The above described embodiment, in which the reinforcement fiber structure is placed in a mold before matrix substance is brought in contact with the reinforcement fiber structure, could in some aspects be combined with one or more of the previously mentioned aspects of adding energy to diluent. Thereby it may be possible to use unheated molds and also to simplify the production process by keeping the intermediate material in the same mold during both adding of mixture and during separation of diluent and matrix substance.

In a method according to an embodiment, when plastic matrix substance is brought in contact with the reinforcement fiber structure, energy is added from within the intermediate material to heat portions of the matrix substance below a boiling temperature of diluent in the mixture in the intermediate material. An advantage of this method is that during addition of diluted matrix substance into the reinforcement fiber structure, the viscosity of fluid introduced into the reinforcement fiber structure is lowered so that the matrix substance easier permeates and wets the fiber structure. Yet, substantial evaporation of diluent is not promoted during introduction of matrix substance into the reinforcement fiber structure, whereby most diluent remains in the matrix substance during introduction of matrix substance to thereby act to lower the viscosity of the mixture. In this way, the production process may be further sped up and wetting of the reinforcement structure may be further promoted.

In an embodiment, an underpressure is provided in the mold, at least during a period of time when matrix substance is brought in contact with a reinforcement fiber structure. This brings an advantage in that the matrix substance easier permeates and wets the reinforcement fiber structure, leading to production time-savings and improved material properties, due to a reduced risk of gas pockets and voids.

Also, a vacuum-like atmosphere may be provided in the mold, at least during a period of time when said mixture is brought in contact with a reinforcement fiber structure. An advantage of this is that the matrix substance even easier permeates and wets the reinforcement fiber structure, leading to more time-savings and further improved material properties, due to a decreased risk of gas pockets and voids.

According to a further embodiment, the mixture may be brought in contact with the reinforcement fiber structure by performing overpressure injection of matrix substance into said reinforcement fiber structure. Doing so further speeds up the production process, promotes better adhesion between fibers and matrix substance and, if possible, promotes a more thorough permeation and better wetting of the fibers, since pressurized matrix substance pushes gas to areas of lower-pressure.

Preferably, an underpressure is provided in the mold during said separation of diluent from matrix substance. Doing so promotes evacuation of evaporated diluent gas, and thereby reduces the risk of having voids and/or gaspockets in the composite material.

It is preferred that one or more mold cavity surfaces of the mold are made of a substantially heat-insulating material, thereby making it easier to control the temperature of the mold contents by controlling said addition of energy to the matrix substance from within the intermediate material, since less heat is transferred to the mold as compared to if heat-conducting molds would have been used. Also, it may be possible to shorten heat up time of the matrix substance, leading to higher production throughput.

Further, one or more mold cavity surfaces of the mold may be made of a substantially electrically insulating material, thereby making it possible to use resistive heating of electrically conductive reinforcement fibers without a need of a separate insulating structure, such as a glass fiber web, for insulating the conductive fibers from any electrically conductive mold cavity surfaces. An advantage of this is that a smoother and more visually appealing surface finish of the molded composite material is achieved as compared to if separate insulating structures, such as glass fiber webs, would have been used between the intermediate material and the mold cavity surfaces.

In a preferred embodiment, the mold is substantially made of plastic, such as one or more of polyoxymethylene, polytetrafluoroethylene and polyethylene terephthalate. Using such molds brings the advantage that the time required for production of the mold may be lowered as compared to producing metal molds. Also, tooling cost of the mold may be kept down and the material cost of the mold may be kept down. Further, using a plastic material for the mold enables easy modification of the mold geometries as compared to using conventional metal molds. The named plastics all provide various advantageous characteristics, such as having low friction, good machinability, good high-temperature resistance, fine surface finish and/or low price. Another advantage of using plastic molds instead of metal molds is that no mold release agent has to be used on the mold surfaces to promote easy removal of the composite material from the mold.

In a preferred embodiment, the diluent is a substantially non-reactive diluent to the matrix substance. This brings the advantage that most of the diluent will not react with the matrix substance, and therefore can be removed from the matrix substance through evaporation or by any other means of removal.

In yet another embodiment, the diluent is an alcohol selected from the group of methanol, ethanol, propanol, butanol, pentanol, hexanol, and heptanol, wherein the matrix substance is an epoxy. Such a combination of matrix substance and diluent provides for a good dilutability. Further, it provides for a good control of diluent evaporation in a temperature range in which the curing of the matrix substance is not too rapid to let evaporated gas leave the intermediate material. Also, the diluent is substantially non-reactive to the epoxy. Once cured, the epoxy provides a high-strength bond between the reinforcement fibers.

In an embodiment, the mixture comprises between 1-70% diluent by volume. Having such an amount of diluent provides for the creation of a low-viscous mixture, which makes it easy to add matrix substance to the fibers, and also provides for an mixture having a suitable amount of shrink during evaporation, such that substantially no portions of the reinforcement structure end up without matrix substance, and such that substantially no cracks appear in the matrix substance during/after gelling caused by shrinkage of the matrix substance/mixture.

According to an embodiment, the reinforcement fiber structure has a carbon fiber contents of at least 30% by weight of the reinforcement fiber structure. Having at least such a carbon fiber contents makes it likely that a thorough heating may be achieved throughout the composite material by resistive heating of the carbon fibers of the reinforcement material.

The above mentioned methods could be used to produce high quality fiber-reinforced plastic composite materials having extremely high fiber volume fractions as compared to what is theoretically possible for the respective reinforcement fiber structure of choice. The results achieved using the method according to the invention gives results that heretofore has not yet been achieved using prior art technology, at least not in such an inexpensive, flexible and time-efficient manner.

According to an aspect, a fiber-reinforced plastic composite material obtained by any one of the above described aspects is provided.

According to another aspect a fiber-reinforced plastic composite material is provided. The material comprises a reinforcement fiber structure and a matrix substance. The reinforcement fiber structure comprises a plurality of reinforcement fibers and the matrix substance is distributed in the reinforcement fiber structure to act as a bond between fibers of the reinforcement fiber structure. Further, the fiber-reinforced plastic composite material has a fiber volume fraction (FVF) being more than 65%.

According to yet another aspect, the fiber-reinforced plastic composite material has a $FVF/T_{max}$ of above 80%. Such a material has the advantage that the obtained composite material is a very good electrical conductor, which makes the material suitable for use in stealth-technology applications. A further advantage of such a material is that it is good heat-conductor, thus making the material less sensitive to local heating, which otherwise might damage the matrix material.

Also, a system for performing a method according to an aspect of the invention is provided. The system comprises a closable mold, an energy supply device, a matrix substance container, a diluent container, a curing agent container and one or more pumps configured to feed fluid from said containers to a mix meter. Further, said system comprises a mold press and a vacuum system. The mold press may be a hydraulic press.

Such a system enables efficient production of high performing composite materials, such as the ones mentioned above.

DESCRIPTION OF THE DRAWINGS

Embodiments of the invention will be described in the following, reference being made to the enclosed drawing.

DETAILED DESCRIPTION OF THE PREFERRED EMBODIMENT

A method according to the invention is primarily intended for use when producing high-performance carbon fiber composite materials, although other uses are feasible. Such materials are especially useful in demanding applications, such as space ships, satellites, aircrafts, ships, boats, sports cars, wind mills, and golf clubs, where it is highly desirable to achieve lightweight constructions having high strength and stiffness. Hereinafter such a method according to an embodiment of the invention will be described.

General Method

In summary, the method according to an aspect of the invention comprises the steps of:
  mixing a matrix substance and a diluent to form a mixture;
  bringing the mixture in contact with a reinforcement fiber structure; and
  separating diluent from matrix substance during curing of the matrix substance to form a fiber-reinforced composite material.

In a method according to an embodiment of the invention, a plastic matrix substance, such as an epoxy or polyester resin, is mixed with a suitable diluent, such as ethanol, to form a mixture. The mixture is then brought into contact with a reinforcement fiber structure, such as carbon fiber webbing, to form an intermediate material. Thereafter, diluent is separated from matrix substance, for example by evaporation of the diluent, while matrix substance is cured to form a fiber-reinforced plastic composite material.

It should be understood that the term matrix substance refers to the matrix substance independently of which phase the material is in. For example, in the case of the matrix substance being said to be an epoxy, this means that the term matrix substance may be used to describe uncured resin, semi-cured as well as cured resin, depending on context if nothing else is explicitly stated.

Also, it should be understood that the wording of 'intermediate material' is not to be confused with 'pre-preg'. Within the context of this disclosure, the wording of 'intermediate material' is used to refer to the composition of resin, diluent, and reinforcement fiber before the resin has fully cured. After the resin has fully cured, the resin and reinforcement fiber composition is rather referred to as 'a fiber-reinforced plastic composite material', or simply 'a fiber-reinforced plastic product'.

If too much diluent is used, there is an increased risk of getting portions of reinforcement fiber structure lacking matrix substance. If too little diluent is used, there is an increased risk of having portions of reinforcement fiber structure which the mixture could not reach, and which therefore are left completely without matrix substance.

In the inventive method, distribution of matrix substance in the fiber structure is facilitated by diluting the matrix substance with a diluent to form a mixture and then distributing the mixture in the reinforcement fiber structure. The mixture is easier to distribute in the reinforcement fiber structure than the matrix substance would have been on its own. Hence, matrix substance can easily be added to substantially all fiber surfaces in the reinforcement fiber structure and even to small spaces formed between the fibers.

The amount of matrix substance needed to achieve a strong and durable bond between the fibers of the reinforcement fiber structure depends on how close to each other the fibers of the reinforcement fiber structure may be brought, which in turn defines the amount of matrix substance needed to bridge the gaps between the fibers and well adhere to the surfaces of fibers. The diameter of the fibers and the arrangement of the fibers in the reinforcement fiber structure ultimately define how close the reinforcement fibers may come to each other, how much they can bend and therefore also how much the reinforcement fiber structure may be compacted. For example, a reinforcement structure of parallel fibers may be brought very close to each other, whilst fibers of a randomly arranged fiber mat may not be brought that close to each other, see FIG. 2.

Especially when several layers of densely woven reinforcement fiber fabric are used in the reinforcement fiber structure, prior art methods of applying resin to the reinforcement fiber structure would not be useful, since it is close to impossible to get the resin to thoroughly permeate the fiber structure, at least in a reasonable time, using prior art methods.

Preparation of Matrix Substance

It should be understood that if a curing agent is needed in order to trigger curing of the matrix substance, the curing agent is preferably mixed with the matrix substance before mixture is brought into the reinforcement structure. One reason for this is due to the fact that it is easier to evenly distribute and mix curing agent in the matrix before the matrix substance has been brought in contact with the reinforcement fiber structure. The amount of curing agent to be added is determined by a specification typically given by the manufacturer of the matrix substance.

A thorough and even mixing of matrix substance and curing agent promotes successful curing of all parts of the matrix substance since all parts of the matrix substance will contain the correct amount of curing agent for complete curing, and since no part of the matrix substance will contain too much or too little curing agent. If too much curing agent is present in the matrix substance, excess curing agent might not react and hence may stay as a liquid in the matrix material, possibly decreasing the strength and/or durability of the composite material. Likewise, if some part of the matrix substance has a too low amount of curing agent, this part of the matrix substance will not properly cure, thereby probably decreasing the strength and/or durability of the composite material.

A thorough and even mixing also promotes even curing of the matrix substance. This in turn makes it easier to control the process of bringing matrix substance in contact with reinforcement fibers since the viscosity of the matrix substance in the mixture is substantially even throughout the mixture.

Distribution of mixture in the reinforcement fiber structure is preferably completed before gelling of the matrix substance begins. The longer the gelling process progresses, the thicker the matrix substance will get and the higher the risk of cracks in the matrix substance will be. Preferably, gelling only occurs after the mixture has been distributed throughout the entire reinforcement fiber structure.

It should be mentioned that the curing speed of matrix substances varies a lot and that some matrix substances will cure very slowly, or not at all, if kept under a certain temperature.

Often, the mixture comprises between 2-15% diluent by volume, but amounts up to at least 70% are possible and helps lowering the viscosity of the mixture. When a high amount of diluent is provided in the mixture, a lot of gas is generated during evaporation of the diluent and therefore a suitably dimensioned venting system must be provided to take care of the evaporated gas. As long as the viscosity of the mixture is low enough to allow for good wetting of the fiber structure, the amount of diluent should be kept low, for example in order to avoid waste of diluent and to avoid unnecessary need of venting.

Preparation of Mixture

When choosing diluent, choose one having a lower viscosity than the matrix substance so that the mixture of them gets a lower viscosity than the matrix substance initially had. Also, it is often wise to choose a diluent that substantially does not react with the matrix substance, so that as much diluent as possible can be separated from the matrix substance before being fully cured. However, it should be understood that a reactive diluent also could be used, as long as it reacts relatively slowly and is separated from the matrix substance before a substantial amount of diluent has had time to react with the matrix substance or with any other additive, such as a curing agent, filler, dye, pigment, or the like.

A mixture of diluent and matrix substance has a relatively low surface tension compared to a non-diluted matrix substance. Thus, the contact angle between the mixture and each respective reinforcement fiber is lowered as compared to non-diluted matrix substance. This brings an advantage in that the mixture relatively easily adapts to, and follows, the complex geometries of the fiber structure so that the fibers are thoroughly wet by matrix substance during distribution of mixture in the reinforcement fiber structure.

Adding Mixture to Reinforcement Fiber Structure

There are a number of ways of bringing mixture in contact with the reinforcement fiber structure, and some of them can be combined in order to, for example, achieve a more thorough distribution of mixture in the reinforcement structure. A thorough distribution means that substantially all parts of the reinforcement structure are wet with mixture and that also hard-to-reach small spaces between the fibers are filled with mixture, and thereby with matrix substance (supposing that the matrix substance was evenly distributed in the mixture during distribution of the mixture in the reinforcement fiber structure).

According to an embodiment, mixture is manually added to the reinforcement fiber structure, such as by use of a brush, or by simply pouring mixture onto the reinforcement fiber structure. Such methods of manual application are most of the time performed without using a mold, or the like. If a mold, or the like, is to be used for holding the reinforcement fiber structure during application, such a mold is preferably an open mold, so that the manual application can be performed with the reinforcement fiber structure positioned in the mold.

According to another embodiment, mixture is brought in contact with the reinforcement fiber structure using capillary action of the fibers. The fiber structure often has thousands, or sometimes millions, of individual fiber filaments, which together act by capillary action to promote travel of low-viscous liquid in contact with the fibers. When mixture is supplied to the reinforcement fiber structure, capillary action sucks mixture further and further throughout the reinforcement fiber structure, wherein a thorough permeation of the reinforcement fiber structure may be achieved. The influence of capillary action is stronger on a mixture according to the invention than it would have been on the matrix substance alone.

According to a further embodiment, the reinforcement fiber structure is placed in a closable mold, wherein mixture is injected into the mold using overpressure.

Here, a closable mold is a mold which can be closed so that the pressure inside the mold cavity/cavities can be controlled. It should be understood that a closable mold may have inlet ports and outlet ports and still be considered closable. An inlet port may for example be a resin injection port, through which a resin, or other matrix substance, may be introduced into the mold. An outlet port may for example be a port to which a vacuum pump or vacuum system is connected for creating underpressure or vacuum inside the mold.

In another embodiment, a vacuum pump, or any other pump capable of creating an underpressure is connected to an outlet port of the closable mold, so that an underpressure may be provided around the reinforcement fibers inside the mold. Thereby, gas is removed from around the reinforcement fiber structure so that mixture easier may wet the structure. When an underpressure is provided in the mold, a pressure differential between supplied mixture and mixture further distributed into the reinforcement fiber structure is increased, wherein the mixture easier distributes in the reinforcement fiber structure and better wets the fibers.

In an embodiment, overpressure injection of mixture is used together with the creation of an underpressure inside the mold, in order to further improve wetting and to lower the time needed to thoroughly wet the fibers.

Separation of Diluent and Matrix Substance

Once enough mixture has been distributed in the reinforcement fiber structure to thoroughly permeate the fiber structure, separation of diluent and matrix substance may be actively promoted, for example by adding energy to diluent from within the intermediate material.

Diluent is preferably separated from matrix substance by means of evaporation of diluent, although it should be understood that any other means of removing diluent could be used, such as by letting it react with another substance or gas and then removing the resulting substance or gas.

One advantage of separation of diluent and matrix substance is that the reinforcement fiber structure is compacted when diluent is separated and removed from the intermediate material, since the mixture shrinks. This is a very effective way of achieving a compact composite material with a high fiber volume-fraction.

When diluent is evaporated, it either finds its way out through liquid matrix substance or through microscopic voids or gas pockets in the complex inner structure of the intermediate material.

If there is a high amount of high-viscous gelled matrix substance as compared to liquid matrix substance, evaporated diluent may have to pass gelled matrix substance on its way out of the intermediate material, wherein there is an increased risk of getting cracks in the gelled matrix substance. Since such cracks may remain in the finished composite material it is desirable to avoid them by evaporating as much of the diluent as possible before surrounding matrix substance gels or cures.

In order to evaporate the diluent, or at least a portion of the diluent, said portion is preferably first given enough energy for it to reach a temperature at which it may begin evaporating at the current surrounding pressure of said portion. A lower surrounding pressure lowers the temperature needed for evaporation and vice versa. Thereafter, additional energy has to be added in order for said portion of diluent to evaporate.

It should be understood that not all diluent is evaporated at one time throughout the mixture, and that the evaporation process is a gradual process.

Hence, once the temperature of at least a portion of the diluent has reached the temperature at which it may begin evaporating at the current surrounding pressure, the diluent may be brought to evaporate by using energy from surrounding gas, liquid or solid material, such as surrounding gas, reinforcement fibers or matrix substance.

It should also be understood that there is an energy balance between the portion of diluent and its surrounding fluids or solids, effectively preventing fast temperature rise of the diluent and its surrounding substances during evaporation of diluent. Here, if the reinforcement fiber structure comprises fibers being good heat conductors, such as carbon fibers, these fibers will help distributing heat throughout the intermediate material, thereby further extending the energy balancing effect that the diluent brings during change of state between liquid- and gas-phase. The energy balancing effect helps keeping the temperature even in the mixture during evaporation of diluent, where after the temperature of portions of matrix substance no longer being surrounded by diluent easier may gain temperature, and hence easier and faster may gel and cure to form the composite material.

In order to speed up evaporation of diluent, energy may be added directly to a portion of diluent or indirectly through surrounding substances, such as through surrounding fibers or matrix substance.

It should be understood that conventional heated molds are unsuitable means of adding energy to diluent, since diluent close to mold cavity surfaces would evaporate first and form gas volumes which would be forced away from the mold-cavity surfaces and into the liquid- or gel-form mixture, many times resulting in bubble formations and gas pockets, which later would remain in the cured plastic. Also, heat from hot mold cavity surfaces would speed up the curing process of matrix substance close to the mold cavity surfaces first, wherein an outer layer, or "shell", of gel-form, or solid, matrix substance would form around the intermediate material, so that diluent would get trapped inside the composite material and possibly form additional gas pockets inside the composite material when additional energy is added. In a worst-case scenario, such trapped diluent would cause internal stress when the composite material is heated and lead to cracks and material failure. Such problems are avoided when using methods according to the invention.

According to an embodiment, separation of diluent and matrix substance is promoted by adding energy from within the intermediate material. This brings an advantage in that diluent within the intermediate material will evaporate before outer matrix substance forms high-viscous gel and before the matrix substance cures to form a solid material. According to this embodiment, the evaporated diluent gas may relatively easily find its way out through voids or surrounding liquid- or gas form substances.

When diluent has been evaporated, most of the time it eventually reaches the outer periphery of the intermediate material. If no mold is used, the evaporated diluent gas is vented into surrounding air. However, if a closable mold is used, evaporated diluent is preferably removed through an underpressure system, such as a vacuum system, possibly assisted by gas transport channels in the cavity surfaces of the mold.

Pressure Differences

Since the mixture cannot move freely within the reinforcement structure, pressure differences may arise within the mixture, and also within the liquid- or gelled matrix substance. For example, if overpressure injection of mixture is used in combination with underpressure in a mold, the pressure of the matrix substance is higher close to inlet ports of the mold than the pressure is in the mixture that has traveled further into the reinforcement structure within the mold.

Pressure differences more easily even out within the mixture in the reinforcement fiber structure when the mixture contains a high percentage of diluent. Also, when diluent evaporates from the mixture, the mixture gets a higher viscosity and therefore cannot as easily as before permeate the reinforcement fiber structure.

As a mid phase of the curing process, between an initial liquid phase and a final cured solid phase, the matrix substance undergoes a gelling phase in which the matrix substance forms a high viscous gel. Once the gelled matrix substance sets to solid, any pressure differences still left in the material during gelling are conserved in the matrix substance in the form of built-in stress, which is clearly undesirable since it lowers the durability of the composite material.

In order to avoid built-in stress, it is desirable to separate a main portion of the diluent, preferably substantially all of the diluent, from the matrix substance before the matrix substance forms a gel, so that substantially no gas will be created in the intermediate material after the matrix substance has formed a gel and so that the shrinkage of the mixture has substantially completed before the matrix substance forms high-viscous gel. Doing so reduces the risk of cracks in the resulting matrix substance.

Methods of Adding Energy to Diluent

Several methods of adding energy exist, all of them bringing their own advantages and some of them being suitable for use together.

According to an embodiment, the reinforcement fiber structure comprises electrically conductive fibers and the addition of energy is, at least partly, performed by conducting electrical current through said electrically conductive fibers.

In an embodiment, electrodes are connected at selected positions on the reinforcement fiber structure, in order to control between which points electrical current travels. The positions of the electrodes depend on the geometry of the composite structure/material to be produced. Since the thickness of the composite structure may vary, there might be a need to adapt the amount of energy introduced into various portions of the reinforcement structure so that no portion of the structure gets too much or too little energy. The amount of energy introduced may be varied by attaching or detaching electrodes and/or by adjusting the potential between an electrode and another. In order to provide places to connect electrodes to the fiber structure, there might be provided a larger fiber structure than what will finally be part of the composite material structure formed. The extra portions or fiber structure may then be removed when they are not needed anymore.

When energy is added through the fibers, the added energy heats the mixture around the fibers, thereby separating diluent from matrix substance starting close to the fibers and eventually leading to promotion of curing of matrix material close to the fibers. Evaporated diluent gas is thereby driven outwards, through non-cured resin, wherein it can evaporate without getting trapped inside the intermediate material.

In one embodiment, the addition of energy is, at least partly, performed by exerting microwaves on the intermediate material. Such a method works without a need of conductive fibers. For example, such a method would be advantageous for parts of a reinforcement fiber structure mainly comprising glass fibers, or for thicker parts in which extra energy would be needed in order to achieve faster evaporation of diluent and/or faster curing.

According to an embodiment, the addition of energy is, at least partly, performed by induction heating of the reinforcement fiber structure. In order for this to work, the reinforcement fiber structure must comprise electrically conductive fibers. An advantage of this is that local heating of portions of the reinforcement fiber structure, such as thicker portions, may be performed without need of heated molds, and without need of direct electrical contact with the reinforcement fibers.

The Reinforcement Fiber Structure

The reinforcement fiber structure may be a web, mat, band or other fiber-structure, or a combination of such structures. Typical fibers suitable for use as reinforcement fibers are carbon-, glass-, aramid- and Kevlar fibers, although other fibers may be suitable depending on their physical properties, such as strength, temperature resistance, conductibility etc.

Curing of Matrix Substance

As previously mentioned, if a curing agent is to be used, curing of matrix substance is preferably initiated before the matrix substance is brought in contact with the reinforcement fiber structure. In such case, the curing process is a chemical process between a matrix substance, such as epoxy or polyester, and a curing agent. Such a curing process may sometimes be accelerated slightly by a modest amount of heating. Also, it should be mentioned that the curing process typically is an exothermic reaction, wherein heat is generated by the chemical reaction of the curing process itself, possibly leading to an even faster curing process, wherein there is a risk of material damage if the temperature gets too high.

Hence, curing of the intermediate material may be performed by doing nothing but waiting, but it may also be slightly accelerated by further addition of heat.

Choice of Diluent and Matrix Substance

The choice of diluent largely depends on the choice of matrix substance, which in turn depends on the desired characteristics of the matrix material, such as high strength, low price, good adhesion to the reinforcement fiber material, good corrosion resistance, low toxicity, etc.

The diluent should have the ability to dilute the matrix material. Also, it should preferably have a normal boiling temperature being high enough not to start evaporating until after the mixture has been brought in contact with the reinforcement fiber structure, and low enough to allow fast enough evaporation of diluent so that outer surrounding matrix substance will not have time to form a gel, as previously described.

Different matrix materials have different recommended curing temperatures. Some matrix materials are suitable for curing in room temperature, whilst others require higher temperatures in order to fully cure. The recommended amount of curing agent is specified by the matrix material manufacturer.

Typical matrix substances are resins, such as epoxy resins commonly used for reinforcement fiber structures or polyester resins commonly used for reinforcing fiber structures.

According to an embodiment, the diluent is an alcohol selected from the group of methanol, ethanol, propanol, butanol, pentanol, hexanol, and heptanol, and the matrix substance is an epoxy resin.

Molds

A mold could be used to define the shape of the composite material to be produced, and/or to affect the process of bringing the mixture in contact with the reinforcement fiber structure. Here, it should be understood that even if the mold is not used for the purpose of defining the shape of the composite material, the mold could be used as a closable volume capable of affecting the process of bringing mixture in contact with a reinforcement fiber structure to form an intermediate material, where after the intermediate material can be removed from the mold and then further treated and/or cured. Accordingly, a mold could be used solely to define the shape of the composite material to be produced, in which case the intermediate material may be produced outside the mold and then placed in the mold.

The shape and design of the mold depends largely on the design of the composite material part to be produced. As previously mentioned, molds can either be open or closed molds. A closed mold may for example be a double side mold having one or more inlet ports separated from one or more outlet ports. The outlet ports may be connected to a vacuum system. Also, the mold may be provided with one or more channels in the mold cavities, into which evaporated diluent may escape and through which evaporated diluent may be led towards the one or more outlet ports of the mold if the outlet ports are open. Hence, even if the outlet port is not open during separation of diluent and matrix substance, evaporated diluent may escape into such cavities of the mold that are not filled with liquid or solid substance.

Preferably, the mold used with a method according to an embodiment of the invention is a plastic mold, such as a mold made from polypropylene. Using a plastic mold instead of a metal mold makes it easier to control between which points current flow through conductive fibers and ensures that no electricity is inadvertently diverted from the reinforcement fiber structure as compared to electrically conductive molds, such as metal molds. Further, using a plastic mold instead of a metal mold brings down the material and tooling costs for the production of the mold. Since the mold does not have to be heated up, production cycle times can be reduced and energy consumption lowered as compared to using heated molds. Another advantage of using plastic molds instead of metal molds is that no mold release agent has to be used on the mold surfaces to promote easy removal of the composite material from the mold.

Production System

Figure 1:
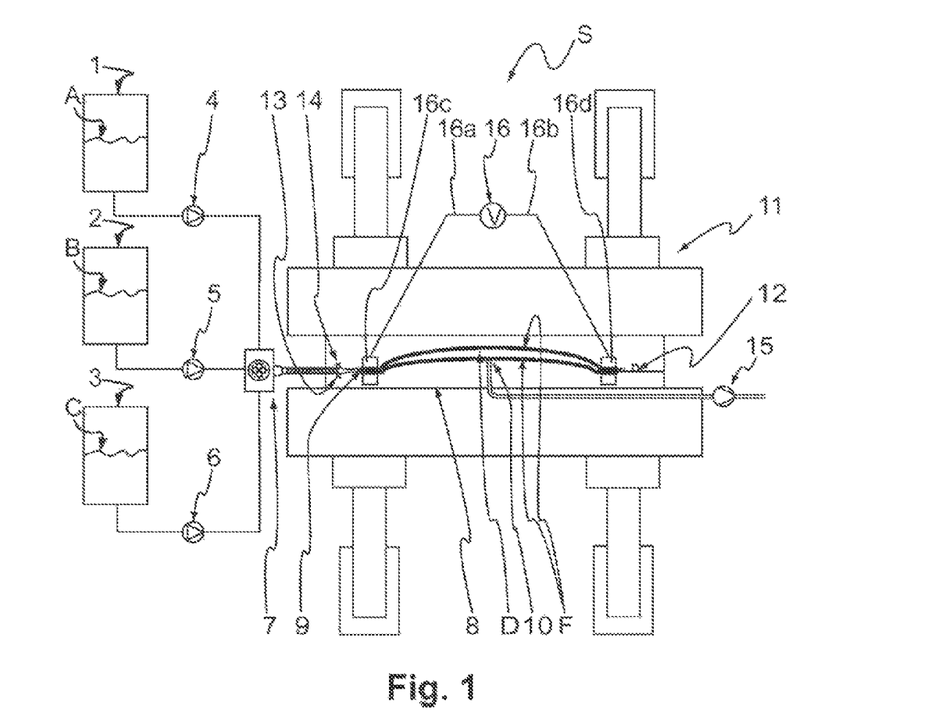
FIG. 1 shows an example of a system for performing a method according to an embodiment of the invention.

A system S for performing a method according to an embodiment of the invention will now be described with reference to FIG. 1. The system S comprises three fluid containers. The first one 1 is configured for storing of matrix substance A, the second one 2 for storing of diluent B, and the third one 3 for storing of curing agent C.

Each container is in fluid connection to a pump 3, 4, 5 configured to feed liquid from each container respectively, through a mix meter 7 and into a mold 8. The mix meter 7 is configured to dose matrix substance, diluent and curing agent, mix them to form a mixture and then feed the mixture into the mold 8 with the help of said pumps 3, 4, 5. The mix meter 7 comprises a disposable mixing unit connecting the mix meter to an inlet port 9 of the mold 8. If/when matrix substance cures in the disposable mixing unit, the unit can easily be exchanged to a new one so that the flow paths of the system are easier to keep clean for forthcoming production runs. The mold 8 typically comprises a plurality of mold parts which can be brought together to define a mold cavity in fluid communication with the inlet port 9 and an outlet port 10. Further, the mold 8 is mounted in a hydraulic press 11 configured to optionally put the mold 8 under heavy pressure. Also, the mold 8 is provided with gaskets 12, 13, 14 configured to ensure that the mold cavity is closed except for any inlet- and outlet ports and hence only in fluid communication with the inlet and outlet ports so that the pressure inside the mold cavity can be controlled by pumping in or sucking out fluid through the inlet- and outlet ports of the mold 8. A vacuum system 15 comprising a vacuum pump is connected to the outlet port 9 of the mold 8. Further, an energy supply device 16 is provided for optionally providing electric power to a reinforcement fiber structure F placed in the mold 8 via wires 16a, 16b and connection blocks/strips 16c, 16d positioned in the mold in electrical connection to conductive fibers of the reinforcement fiber structure F. Further, a core C may be placed in the mold cavity for supporting the reinforcement fiber structure F.

It should be understood that the hydraulic press could be replaced by any other means of pressing the mold parts together, such as a plurality of screws acting directly or indirectly on the mold.

A Method of Using the System

First, the three containers 1, 2, 3 are filled with epoxy base A, ethanol B and epoxy curing agent C, respectively. Then, the mold is opened and a reinforcement fiber structure F comprising a plurality of layers or carbon fiber web is cut to suitable size and positioned in the mold cavity around a core D, where after the mold 8 is closed and put under pressure by means of the hydraulic press 11. The vacuum system 15 and the mix meter 7 are connected to the mold and the vacuum system 15 activated to provide a vacuum-like atmosphere inside the mold cavity and all hoses and other spaces in fluid communication with the mold cavity. Once the vacuum-like atmosphere has been achieved, the pumps 4, 5, 6 and the mix meter 7 are activated to feed mixture into the mold cavity under high pressure so that the reinforcement fiber structure F is thoroughly permeated by the mixture for forming an intermediate material. Once the mold cavity has been filled with mixture, the energy supply device 16 is activated to resistively heat thereto electrically connected carbon fibers in the reinforcement fiber structure F so that ethanol B is separated from mixed epoxy A+C from within the intermediate material. Evaporated ethanol B is vented away from the mold cavity through the outlet port 10 of the mold 8 using the vacuum system 15. Once substantially all ethanol B has been separated from the mixed epoxy A+C and vented away, the resistive heating is adapted to a suitable level for promoting faster curing of the mixed epoxy A+C without overheating it.

TABLE 1

Material properties as compared to prior art materials

| Reinforcement fiber structure type | $T_{max}$* | Material typically obtainable by a method according to the invention | | Best material obtained by prior art methods | |
|---|---|---|---|---|---|
| | | Actual FVF** in composite material | Actual FVF as compared to $T_{max}$*** | Actual FVF** in composite material | Actual FVF as compared to $T_{max}$*** |
| Unidirectional fibers | 91% | ≥80% | ≥88% | ≈65% | ≈72% |
| Twill-woven fibers | 73% | ≥65% | ≥89% | ≈55% | ≈75% |

*$T_{max}$ = Theoretical maximum fiber volume of the reinforcement fiber structure
**FVF = Fiber Volume Fraction
***Actual FVF as compared to $T_{max}$ = FVF/$T_{max}$ Table 1 shows material properties of materials typically obtainable through a method according to the invention compared to material properties of the best known fiber-reinforced plastic composite materials produced by prior art methods.

Figure 2:
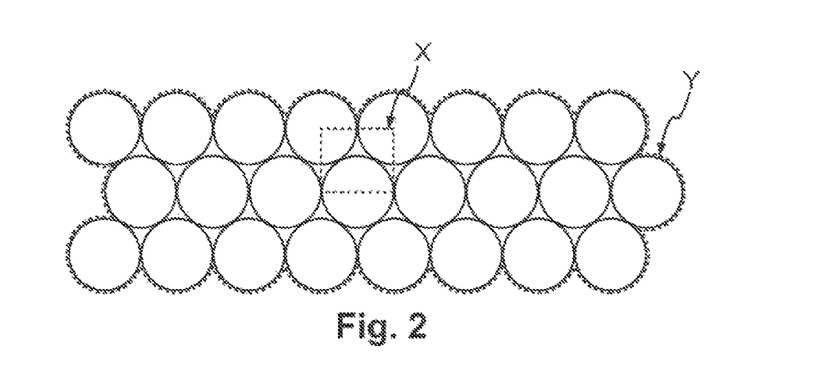
FIG. 2 shows a cross section of a portion of a reinforcement fiber structure of unidirectional fibers.

As previously mentioned it should be understood that for any specific reinforcement fiber structure there is a theoretical maximum for how much fibers that according to the fiber orientation and relative position of the fibers in structure may be fit within the boundary (Y) of the structure. The theoretical maximum fiber volume fraction ($T_{max}$) for any given reinforcement fiber structure may be approximated by mathematical calculations. For example, as shown in FIG. 2, $T_{max}$ for unidirectional fibers may be approximated by calculating the cross sectional area of the fibers 17 and dividing that area by the total area of the cross section of the reinforcement fiber structure. For unidirectional fiber structures with many fibers the area may be approximated by calculating $T_{max}$ for the repetitive area indicated by the box X in FIG. 2.

As shown in Table 1, calculations give that $T_{max}$ for unidirectional fibers is approximately 91%, wherein $T_{max}$ for the twill-woven reinforcement fiber structure is approximately 73%.

An actual measured value for the fiber volume fraction (FVF) in a piece of material comprising plastic reinforced twill woven fibers obtained by a method according to the invention is approximately 65%, possibly higher.

The actual fiber volume fraction as compared to the theoretical maximum fiber volume fraction can be calculated as $FVF/T_{max}$.

Even higher fiber volume fractions than those shown in Table 1 above have been achieved using the method of the invention, for example about 71% for twill-woven fibers, and about 82% for unidirectional fibers, which translates to $FVF/T_{max}$-values of about 97% and 90% respectively.

As shown in Table 1, the highest FVF obtained in a composite material comprising plastic reinforced unidirectional fibers using prior-art methods is approximately 65%, whilst the corresponding value for twill-woven fibers is 55%.

For the best of known methods, this gives $FVF/T_{max}$-values of 72% for unidirectional fibers and 75% for twill-woven fibers.

A high FVF is known in the art to give desirable material properties and is thus desirable to achieve.

Obviously, unidirectional fibers are easier to structure in a compact manner than less well ordered fiber structures, such as the twill weave, or such as a mat with randomly oriented fibers. Hence, it is easier to achieve a high FVF for a composite material made from unidirectional fibers than one made from twill woven fibers. Of course, the achieved FVF is always below $T_{max}$ for any given reinforcement fiber structure.

It should be mentioned that the invention is not limited to the embodiments described herein, and several modifications are feasible within the scope of the invention as defined in the appended claims. For instance, microwaves or sound waves could be used to add energy from within the intermediate material in order to heat portions of the matrix substance below a boiling temperature of diluent in the mixture in the intermediate material

The invention claimed is:

1. A method of producing a fiber-reinforced plastic composite material comprising the steps of:
    [a] bringing an epoxy matrix substance in contact with a reinforcement fiber structure to form an intermediate material, wherein the reinforcement fiber structure is placed in a mold during at least part of the performance of forming the intermediate material, and wherein energy is added from within the intermediate material to heat portions of the epoxy matrix substance below a boiling temperature of diluent in the mixture in the intermediate material, and
    [b] curing the epoxy matrix substance of the intermediate material to form the composite material,
    said method further comprising the steps of:
    [c] mixing the epoxy matrix substance and a diluent prior to step [a] to form a mixture, and
    [d] during step [b] separating diluent from the epoxy matrix substance, by adding energy to diluent from within the intermediate material,
    wherein said reinforcement fiber structure comprises electrically conductive fibers, and wherein step [d] is, at least partly, performed by conducting electrical current through said electrically conductive fibers by means of induction heating, or
    wherein step [d] is, at least partly, performed by exerting microwaves on the intermediate material to promote separation of diluent from the epoxy matrix substance.
2. A method according to claim 1, wherein an underpressure is provided in the mold, at least during performance of step [a].
3. A method according to claim 1, wherein a vacuum atmosphere is provided in the mold, at least during performance of step [a].
4. A method according to claim 1, wherein step [a] is performed by overpressure injection of the epoxy matrix substance into said reinforcement fiber structure.
5. A method according to claim 1, wherein an underpressure is provided in the mold during performance of step [d].
6. A method according to claim 1, wherein one or more mold cavity surfaces are heat insulating.
7. A method according to claim 1, wherein one or more mold cavity surfaces are electrically insulating.
8. A method according to claim 1, wherein the mold is substantially made of plastic.
9. A method according to claim 8, wherein the plastic is selected from the group of polyoxymethylene, polytetrafluoroethylene and polyethylene terephthalate.
10. A method according to claim 1, wherein the diluent is a substantially non-reactive diluent to the matrix substance.
11. A method according to claim 1, wherein the diluent is an alcohol chosen from the group of methanol, ethanol, propanol, butanol, pentanol, hexanol, and heptanol.
12. A method according to claim 1, wherein the mixture comprises between 1-70% diluent by volume.
13. A method according to claim 1, wherein the reinforcement fiber structure has a carbon fiber contents of at least 30% by weight of the reinforcement fiber structure.

* * * * *